United States Patent
Lee et al.

[11] Patent Number: 6,167,004
[45] Date of Patent: Dec. 26, 2000

[54] ERROR SIGNAL DETECTING APPARATUS OF OPTICAL PICKUP ADOPTING HOLOGRAM GRATING

[75] Inventors: Yong-jae Lee; Tae-Kyung Kim, both of Suwon; Pyong-yong Seong; Jang-hoon Yoo, both of Seoul; Byung-ryul Ryoo, Suwon; Yong-ki Son, Suwon; Seok-jung Kim, Suwon, all of Rep. of Korea

[73] Assignee: Samsung Electronics Co., Ltd., Suwon, Rep. of Korea

[21] Appl. No.: 09/433,296

[22] Filed: Nov. 3, 1999

[30] Foreign Application Priority Data

Nov. 3, 1998 [KR] Rep. of Korea ............... 98-46935

[51] Int. Cl.$^7$ ........................................... G11B 7/00
[52] U.S. Cl. ........................... 369/44.23; 369/44.37; 369/103
[58] Field of Search ..................... 369/103, 109, 369/110, 112, 120, 44.37, 44.23, 44.41

[56] References Cited

U.S. PATENT DOCUMENTS

| | | | |
|---|---|---|---|
| 5,717,675 | 2/1998 | Yamamoto | 369/103 X |
| 5,737,296 | 4/1998 | Komma et al. | 369/103 |
| 5,748,599 | 5/1998 | Yamamoto et al. | 369/103 |

*Primary Examiner*—Paul W. Huber
*Attorney, Agent, or Firm*—Burns, Doane, Swecker & Mathis, L.L.P.

[57] ABSTRACT

An error signal detecting apparatus for an optical pickup employing a hologram grating, including a sensing lens for focusing light reflected from a recording medium, a hologram grating having first through fourth pattern regions arranged clockwise in a 2×2 matrix arrangement, for diffracting light incident from the sensing lens in different directions, wherein the first through fourth pattern regions a, b, c and d are formed such that a first focus of the +1st-order diffracted beams diffracted by the first and third pattern regions is relatively farther from the sensing lens than a second focus of the +1st-order diffracted beams diffracted by the second and fourth pattern regions, a photodetector disposed between the first and second focuses and having first through fourth light receiving units, for receiving the beams diffracted by the first through fourth pattern regions and independently photoelectrically converting the same, and a signal operation unit for detecting a focus error signal and/or a track error signal from detection signals of the light receiving parts. The error signal detecting apparatus can suppress generation of an offset of a focus error signal due to a change in the wavelength of a light source and an offsets of the focus error signal and track offset signal due to deviations of the photodetector.

9 Claims, 7 Drawing Sheets

FOCUS MOVING DISTANCE

ERROR SIGNAL DETECTING APPARATUS OF OPTICAL PICKUP ADOPTING HOLOGRAM GRATING

BACKGROUND OF THE INVENTION

1. Field of the Invention

The present invention relates to an optical pickup, and more particularly, to an error signal detecting apparatus of an optical pickup adopting hologram grating for suppressing the generation of offsets of focus and/or track error signals.

2. Description of the Related Art

In a high-capacity recording and/or reproducing optical pickup, focus and/or track error signals must be detected in order to perform a stable servo function. In general, in a recording/reproducing optical pickup, the path of the light emitted from a light source is changed by a light path changing means, e.g., a beam splitter, and the light is converted into focus light by an objective lens to then be incident onto a disk. The path of the light including an information signal reflected from the recording plane of the disk is changed by the light path shifting means to then be detected by a photodetector via a sensing lens and/or an astigmatic lens.

Referring to FIG. 1 schematically showing a conventional error signal detecting apparatus of an optical pickup, the light reflected from a disk (not shown) is received in a photodetector 6 having four light receiving regions which are photoelectrically converted independently, via a sensing lens 2 and/or astigmatic lens 4.

When the signals detected from the respective light receiving regions of the photodetector 6 are referred to as A, B, C and D, respectively, a focus error signal FES equals (A+C)−(B+D), and a track error signal TES, i.e., a push-pull signal, equals (A+D)−(B+C).

FIGS. 2A through 2C show a change in the light spots received in the photodetector 6 according to the distance between an objective lens (not shown) and a disk (not shown). FIG. 2A shows a light spot 8 formed on the photodetector 6 in the case where the distance between the objective lens and the disk is greater than the focal distance of the objective lens. FIG. 2B shows a light spot 10 formed on the photodetector 6 in the case where the distance between the objective lens and the disk equals the focal distance of the objective lens, that is, in an on-focus state. FIG. 2C shows a light spot 12 formed on the photodetector 6 in the case where the distance between the objective lens and the disk is smaller than the focal distance of the objective lens. Here, the illustration of FIG. 2A corresponds to the case where FES<0, the illustration of FIG. 2B corresponds to the case where FES=0, and the illustration of FIG. 2C corresponds to the case where FES>0.

In the above-described conventional error signal detecting apparatus, since the diameter of the light spot formed on the photodetector 6 is small, i.e., about 0.1 mm, the FES and TES signals become sensitive to deviations of the photodetector 6. Accordingly, focus and/or track offsets in which the FES and TES signals have values other than zero even at on-focus and on-track states may occur.

As the wavelengths of light emitted from a light source are changed for recording an information signal on a disk or the wavelengths vary according to the change in the temperature, a color aberration occurs at optical elements, In fact, in most of optical elements, an increase in the wavelength reduces the refractive index. Thus, a different light spot (14 in FIG. 3) from that being in an on-focus state in which there is no color aberration is received in the photodetector 6 even if the photodetector 6 is in an on-focus state, and the focus error signal is not zero.

As described above, even if a color aberration occurs due to a change in the wavelength, a servo drives an objective lens such that the FES signal becomes zero, thereby performing focusing. Thus, in an actual state, a defocused light spot is formed on a disk. If defocusing occurs during recording, the characteristics of a reproduced signal are deteriorated.

SUMMARY OF THE INVENTION

To solve the above problems, it is an objective of the present invention to provide an error signal detecting apparatus of an optical pickup adopting hologram grating for suppressing generation of an offset of a focus error signal, caused due to a change in the wavelength of a light source and the offsets of focus and/or track error signals, caused due to the deviation of a photodetector.

To achieve the above objective, there is provided an error signal detecting apparatus for an optical pickup employing a hologram grating, including a sensing lens for focusing light reflected from a recording medium, a hologram grating having first through fourth pattern regions arranged clockwise in a 2×2 matrix arrangement, for diffracting light incident from the sensing lens in different directions, wherein the first through fourth pattern regions a, b, c and d are formed such that a first focus of the +1st-order diffracted beams diffracted by the first and third pattern regions is relatively farther from the sensing lens than a second focus of the +1st-order diffracted beams diffracted by the second and fourth pattern regions, a photodetector disposed between the first and second focuses and having first through fourth light receiving units, for receiving the beams diffracted by the first through fourth pattern regions and independently photoelectrically converting the same, and a signal operation unit for detecting a focus error signal and/or a track error signal from detection signals of the light receiving parts.

Here, the first through fourth light receiving units include first through fourth bisectional light receiving parts each for receiving a diffracted beam among ±1st-order diffracted beams diffracted by the first and fourth pattern regions.

It is preferred that the first through fourth bisectional light receiving parts are positioned substantially on the first and fourth quadrants of a x-y coordinate system, respectively, are bisected parallel to the x-axis, one-side sectional light receiving parts of the first and third bisectional light receiving parts are disposed inward with respect to the other-side sectional light receiving parts thereof, and one-side sectional light receiving parts of the second and fourth bisectional light receiving parts are disposed inward with respect to the other-side sectional light receiving parts thereof.

Preferably, the signal operation unit obtains differences between the detection signals of the respective bisectional light receiving parts and sums the differences between the detection signals to detect a focus error signal.

Preferably, the first through fourth light receiving parts further includes first through fourth single light receiving parts for receiving another diffracted beams diffracted by the first through fourth pattern region.

Here, the signal operation unit obtains a difference between the sum signal of the first and fourth single light receiving parts and the sum signal of the second and third single light receiving parts to detect the track error signal.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

An error signal detecting apparatus according to the present invention receives light irradiated from a light source (not shown) and reflected from a disk and detects a focus error signal and/or a track error signal, so that an optical pickup records/reproduces an information signal while tracing the correct track position of a recording medium, that is, a disk (not shown). Also, the error signal detecting apparatus can detect the information signal.

Figure 1:
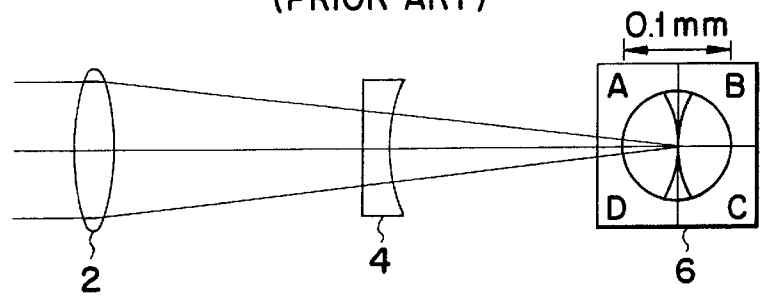
FIG. 1 is a schematic view illustrating a conventional error signal detecting apparatus for an optical pickup.
Figure 2A:
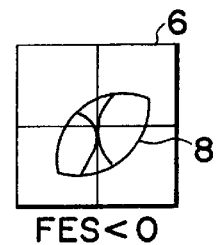
FIGS. 2A through 2C show the change in light spots formed on a photodetector according to the distance between an objective lens and a disk.
Figure 2B:
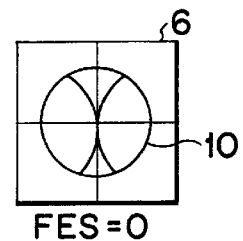
Figure 2C:
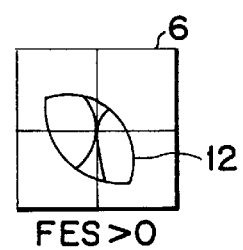
Figure 3:
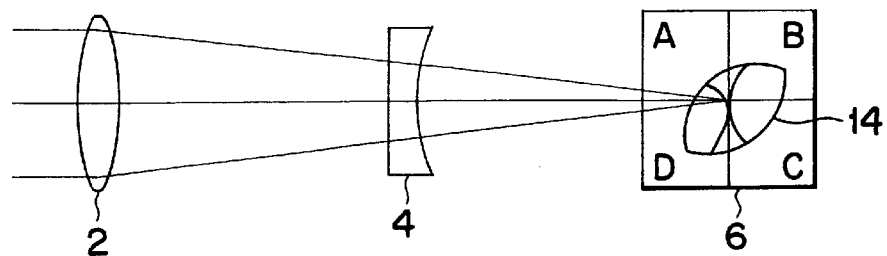
FIG. 3 shows a light spot formed on the photodetector shown in FIG. 1 in an on-focus state according to the change in wavelengths.
Figure 4:
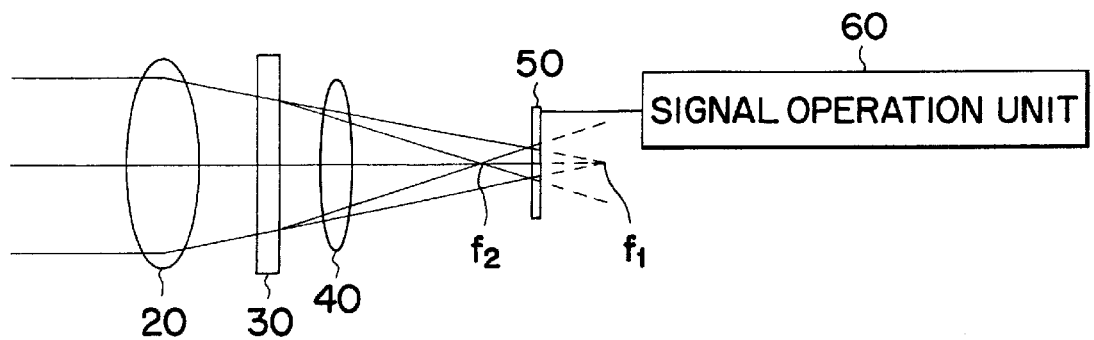
FIG. 4 is a schematic view illustrating an error signal detecting apparatus for an optical pickup employing a hologram grating according to the present invention.
Figure 5:
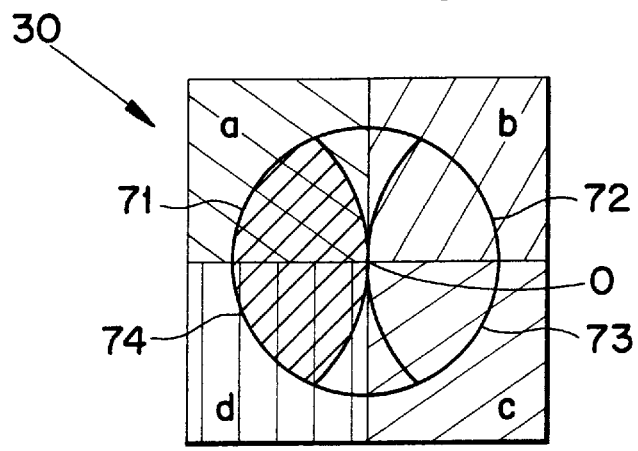
FIG. 5 is a plan view schematically illustrating the hologram grating according to the present invention.

Referring to FIGS. 4 and 5, the error signal detecting apparatus according to the present invention includes a sensing lens 20 for focusing the light reflected from a disk (not shown), a hologram grating 30 for diffracting the light incident from the sensing lens 20 in different directions, a photodetector 50 for receiving the light diffracted by the hologram grating 30, and a signal operation unit 60 for detecting a focus error signal and/or a track error signal.

The hologram grating 30 includes first through fourth pattern regions a, b, c and d arranged clockwise in a 2×2 matrix arrangement. These pattern regions a, b, c and d divide the incident light into four parts, and then diffract quadrant light spots 71, 72, 73 and 74 to produce ±1st-order diffracted beams, respectively.

The pattern regions a, b, c and d are arranged at predetermined angles with respect to one another so as to diffract the quadrant light spots 71, 72, 73 and 74 in different directions. In at least some of the pattern regions a, b, c and d, pattern spacings are different from one another so as to diffract the same order diffracted light at different diffraction angles.

Here, the pattern direction and pattern spacing of the pattern regions a, b, c and d are designed in consideration of the arrangement of light receiving regions of the photodetector 50 to be described later. In other words, the first and fourth pattern regions a and d diffract the incident light spots 71 and 74 so that their +1st-order diffracted beams are positioned substantially on the first quadrant of the orthogonal coordinate shown in FIG. 6 and their −1st-order diffracted beams are positioned substantially on the third quadrant. The second and third pattern regions b and c diffract the incident light spots 72 and 73 so that their +1st-order diffracted beams are positioned substantially on the fourth quadrant of the coordinate shown in FIG. 6 and their −1st-order diffracted beams are positioned substantially on the second quadrant.

In this embodiment, the first through fourth pattern regions a, b, c and d are formed such that a first focus $f_1$ of the +1st-order diffracted beams diffracted by the first and third pattern regions a and c is relatively farther from the sensing lens 20 than a second focus $f_2$ of the +1st-order diffracted beams diffracted by the second and fourth pattern regions b and d.

Here, the photodetector 50 is preferably disposed between the first and second focuses $f_1$ and $f_2$, and more preferably in the middle thereof.

In this case, the +1st-order diffracted beams 71a and 73a diffracted by the first and third pattern regions a and c are focused at the focus $f_1$ behind the photodetector 50, and the +1st-order diffracted beams 72a and 74a diffracted by the second and fourth pattern regions b and d are focused at the focus $f_2$ in front of the photodetector 50.

Likewise, the −1st-order diffracted beams 71b and 73b diffracted by the first and third pattern regions a and c are focused at the focus $f_2$ in front of the photodetector 50, and the −1st-order diffracted beams 72b and 74b diffracted by the second and fourth pattern regions b and d are focused at the focus $f_1$ behind the photodetector 50.

Thus, in an on-focus state, the sizes of the light spots of the ±1st-order diffracted beams received in the photodetector 50 by the first through fourth pattern regions a, b, c and d are substantially the same.

Here, the first through fourth pattern regions a, b, c and d divide incident light spots and diffract only the light beams incident thereto. Thus, the light spots of the ±1st-order diffracted beams are in inverted images, as shown in FIG. 6, and 0 in FIG. 5 is the origin of the inverted images.

Meanwhile, a focus adjusting lens 40 may be further provided between the hologram grating 30 and the photodetector 50. Here, the focus adjusting lens 50 is preferably disposed between the hologram grating 30 and the second focus $f_2$.

Figure 6:
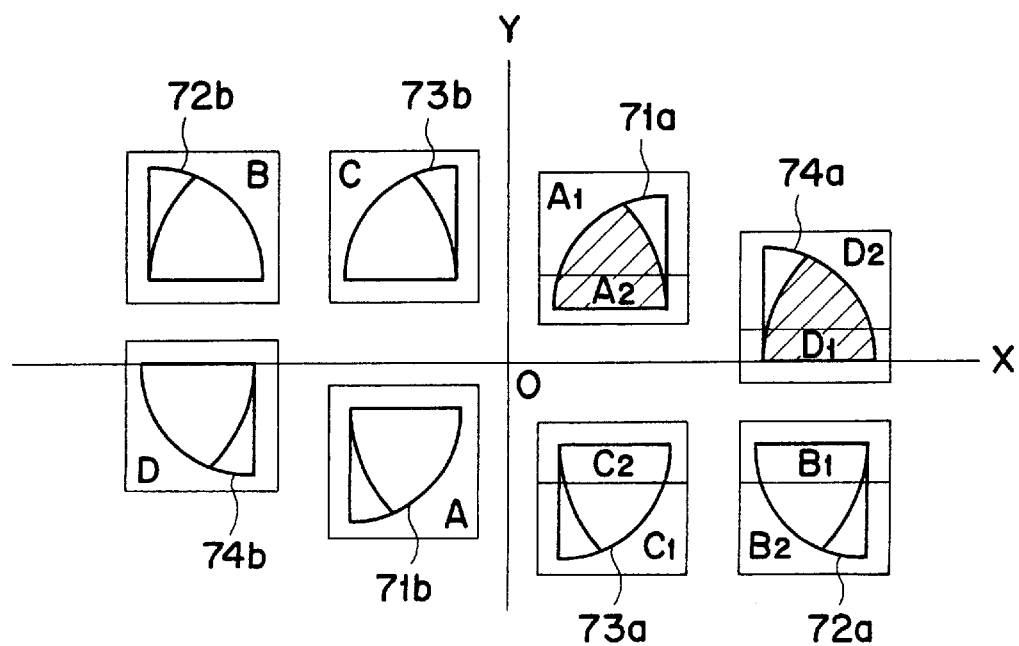
FIG. 6 is a plan view schematically illustrating a photodetector according to the present invention.

The photodetector 50, as shown in FIG. 6, includes first through fourth light receiving parts for receiving the beams diffracted by the first through fourth pattern regions a, b, c and d and independently photoelectrically converting the same.

The first through fourth light receiving parts include single light receiving parts A, B, C and D for receiving the −1st-order diffracted beams 71b, 72b, 73b and 74b diffracted by the first through fourth pattern regions a, b, c and d, respectively, and bisectional light receiving parts A1/A2, B1/B2, C1/C2 and D1/D2.

In view of the design of the pattern regions a, b, c and d, the bisectional light receiving parts A1/A2 and D1/D2, the single light receiving parts B and C, the single light receiving parts A and D, and the bisectional light receiving parts B1/B2 and C1/C2 are substantially arranged on the first, second, third and fourth quadrants, respectively, along the x-axis direction.

Also, the bisectional light receiving parts A1/A2, B1/B2, C1/C2 and D1/D2 are partitioned such that the partition lines are parallel to the x-axis. Sectional light receiving parts A2, C2, B1 and D1 are closer to the x-axis than sectional light receiving parts A1, C1, B2 and D2. In other words, the sectional light receiving parts A2 and C2 are disposed inward with respect to the sectional light receiving parts A1 and C1, and the sectional light receiving parts B1 and D1 are disposed inward with respect to the sectional light receiving parts B2 and D2.

The single light receiving part D and the sectional light receiving part D1 are disposed such that parts thereof are laid across the x-axis so as to receive the ±1 st- order diffracted beams 74a and 74b diffracted by the fourth pattern region d having a pattern formed so as to diffract the beam in a direction parallel to the x-axis (see FIG. 5).

If the photodetector 50 is disposed substantially in the middle of the focuses $f_1$ and $f_2$, the sizes of the light spots of the ±1st-order diffracted beams received in the photodetector 50 by the first through fourth pattern regions a, b, c and d are substantially the same in an on-focus state, as shown in FIG. 6.

The signal operation unit 60 detects the focus and/or track error signal from the signals detected from the light receiving parts. The signal operation unit 60 obtains differences between the detection signals of the respective bisectional light receiving parts A1/A2, B1/B2, C1/C2 and D1/D2 and sums the differences between the detection signals to detect the focus error signal.

In the case of the beam diffracted by the first and third pattern regions a and c, the detection signals of the sectional light receiving parts A2 and C2 closer to the x-axis are subtracted from those of the sectional light receiving parts A1 and C1 distant from the x-axis. In the case of the beam diffracted by the second and fourth pattern regions b and d, the detection signals of the sectional light receiving parts B2 and D2 distant from the x-axis are subtracted from those of the sectional light receiving parts B1 and D1 closer to the x-axis. Then, the respective subtraction results are summed altogether. The focus error signal FES can then be derived as a distinct difference signal from the following formula (1):

$$FES = (A1 - A2) + (B1 - B2) + (C1 - C2) + (D1 - D2)$$
$$= (A1 + B1 + C1 + D1) - (A2 + B2 + C2 + D2)$$
(1)

wherein, in the on-focus state, A1=A2, B1=B2, C1=C2 and D1=D2 so that the focus error signal FES becomes zero. This result can be obtained by appropriately designing the position of the sectional boundary lines of the bisectional light receiving parts in view of the hologram grating 30, or by appropriately amplifying the detection signals of the sectional light receiving parts in the signal operation unit 60.

Figure 7A:
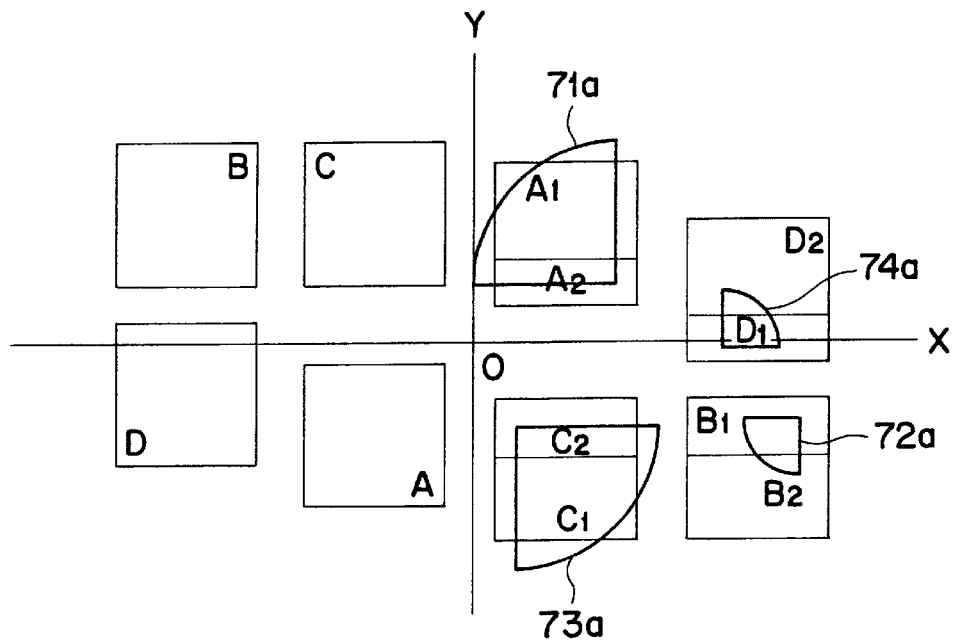
FIGS. 7A and 7B show the change in light spots formed on a photodetector in the error signal detecting apparatus according to the present invention, when the distance between an objective lens and a disk is shorter than the focal distance of the objective lens, and when the distance between an objective lens and a disk is longer than the focal distance of the objective lens, respectively.

When the distance between the disk and the objective lens is smaller than the focal distance of the objective lens, the focus of the light diffracted by the hologram grating 30 moves away from sensing lens 20. Thus, as shown in FIG. 7A, the light spots 71a and 73a become larger than those shown in FIG. 6 and the light spots 72a and 74a become smaller than those shown in FIG. 6. Thus, the focus error signal FES becomes greater than zero.

Figure 7B:
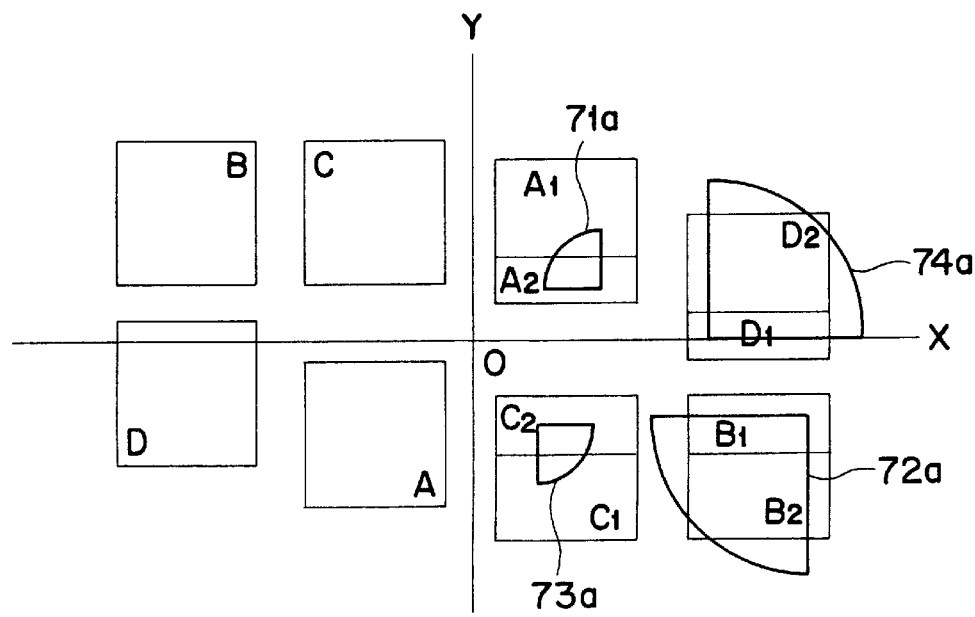

When the distance between the disk and the objective lens is greater than the focal distance of the objective lens, as shown in FIG. 7B, the light spots 71a and 73a become smaller and the light spots 72a and 74a become larger, so that the focus error signal FES becomes smaller than zero.

The signal operation unit 60 obtains a difference between the sum signal (A+D) of the single light receiving parts A and D and the sum signal (B+C) of the single light receiving parts B and C to detect the track error signal TES by a push-pull method, which is represented by the following formula (2).

$$TES=(A+D)-(B+C)$$
(2)

Alternatively, the TES can be detected by a differential phase detection (DPD) method for detecting a phase difference between the sum signal (A+D) of the single light receiving parts A and D and the sum signal (B+C) of the single light receiving parts B and C. This method is particularly useful for DVD-ROMs.

Meanwhile, the signal operation unit 60 can detect an information signal by summing the detection signals of the single light receiving parts A, B, C and D, or the detection signals of the single light receiving parts A, B, C and D and the bisectional light receiving parts A1/A2, B1/B2, C1/C2 and D1/D2.

The information signal is then determined as follows:

Information signal=(A+B+C+D) or (A+B+C+D+A1+A2+B1+B2+ C1+C2+D1+D2).

Here, the photodetector 50 according to the present invention may consist of only the bisectional light receiving parts A1/A2, B1/B2, C1/C2 and D1/D2, and the signal operation unit 60 can detect the track error signal and the information signal using the detection signals of the bisectional light receiving parts A1/A2, B1/B2, C1/C2 and D1/D2.

In this case, the track error signal TES is determined using the following relationship:

$$TES=(A1+A2+D1+D2)-(B1+B2+C1+C2).$$

Now, the principle of the error signal detecting apparatus according to the present invention suppressing generation of an offsets of a focus error signal and/or a track error signal will be described with reference to FIGS. 8 through 12.

Figure 8A:
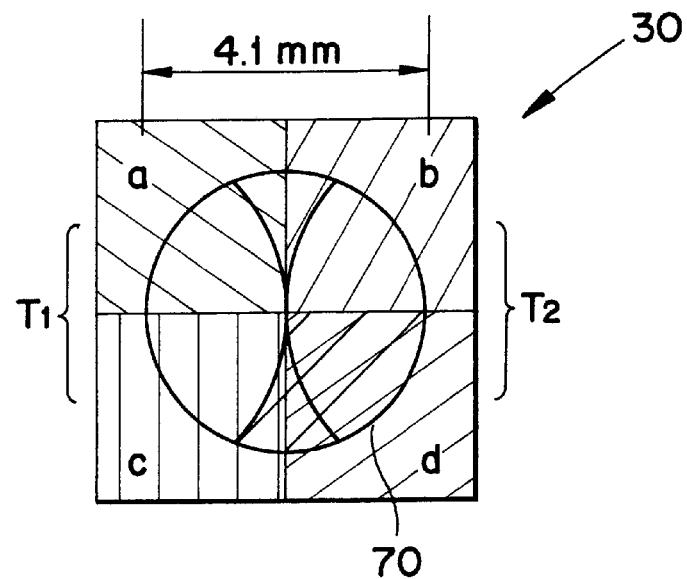
FIGS. 8A and 8B are diagrams for explaining the principle of the error signal detecting apparatus according to the present invention suppressing generation of an offset of a track error signal.

FIG. 8A shows a light spot reflected from a disk and incident into the hologram grating 30 according to the present invention, for explaining the principle of the error signal detecting apparatus according to the present invention suppressing generation of an offset of a track error signal.

Figure 8B:
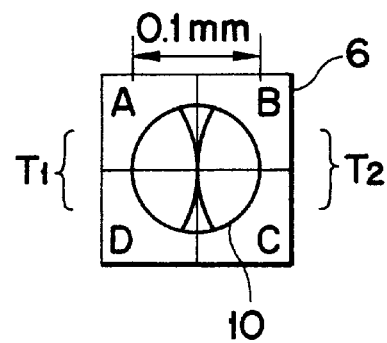

According to the conventional error signal detecting apparatus, since an error signal is detected by dividing a light spot 10 received in the photodetector 6 and having a diagram of about 0.1 mm, as shown in FIG. 8B, an offset sensitive to deviations of the photodetector 6, in particular, a large amount of the offset of a track error signal (T1−T2), is generated. Here, T1 is the sum of the detection signals of the first and fourth light receiving regions A and D, and T2 is the sum of the detection signals of the second and third light receiving regions B and C. However, according to the present invention, as shown in FIG. 8A, since an error signal is detected by dividing and diffracting a light spot 70 incident into the hologram grating 30 and having a diameter of about 4.1 mm, generation of an offset due to deviations of the photodetector 50 can be suppressed. In the present invention, the offset may be caused by a shift of the hologram grating 30. However, since the diameter of the light spot 70 is sufficiently large, that is, about 4.1 mm, even if the hologram grating 30 is somewhat shifted, a change in the light spot 70 passing through a region T1 (pattern region a+pattern region d) and a region T2 (pattern region b+pattern region c), that is, a change in the amount of light, is small. Thus, the generated offset is negligible.

Figure 9:
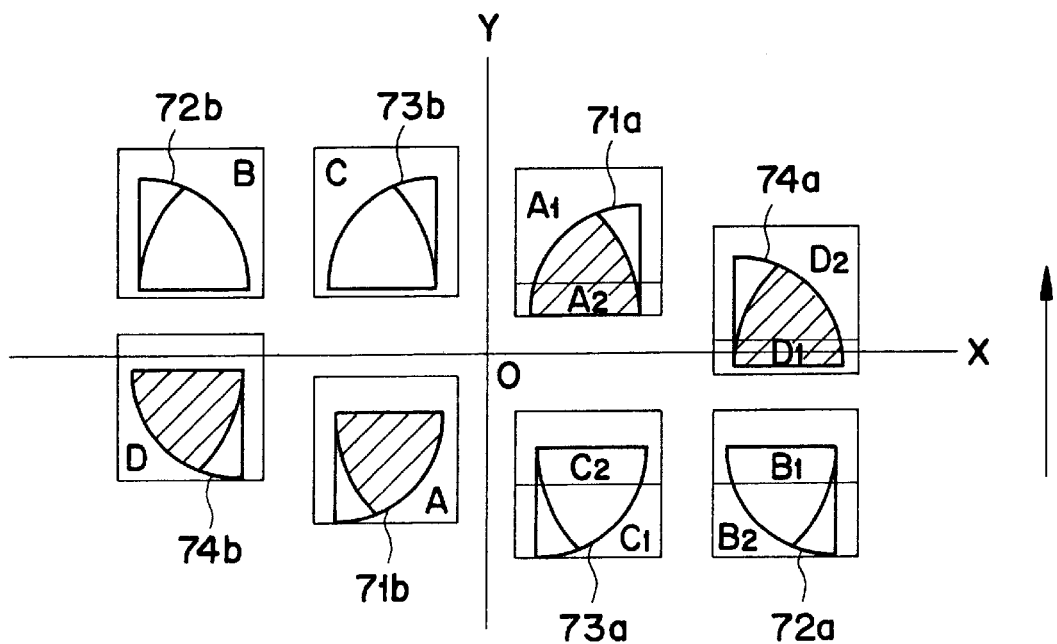
FIG. 9 is a diagram for explaining the principle of the error signal detecting apparatus according to the present invention suppressing generation of an offset of a focus error signal due to the deviation of the photodetector.

FIG. 9 is a diagram for explaining the principle of the error signal detecting apparatus according to the present invention suppressing generation of an offset of a focus error signal due to the deviation of the photodetector 50.

According to the error signal apparatus of the present invention, since the bisectional light receiving parts are divided in the y-axis direction, an offset is not generated due to deviations of the photodetector 50 in the x-axis direction.

In an on-focus state, with respect to deviations of the photodetector 50 in the y-axis direction, for example, in the +y direction, differences in the detection signals between the bisectional light receiving parts A1/A2 and C1/C2 are such that A1−A2=−S and C1−C2=S. Also, differences in the detection signals between the bisectional light receiving parts B1/B2 and D1/D2 are such that B1−B2=−T and D1−D2=T. Therefore, the focus error signal becomes zero, that is, (A1−A2)+(C1−C2)+(B1−B2)+(D1−D2)=−S+S−T+T=0, so that an offset is not generated.

Figure 10:
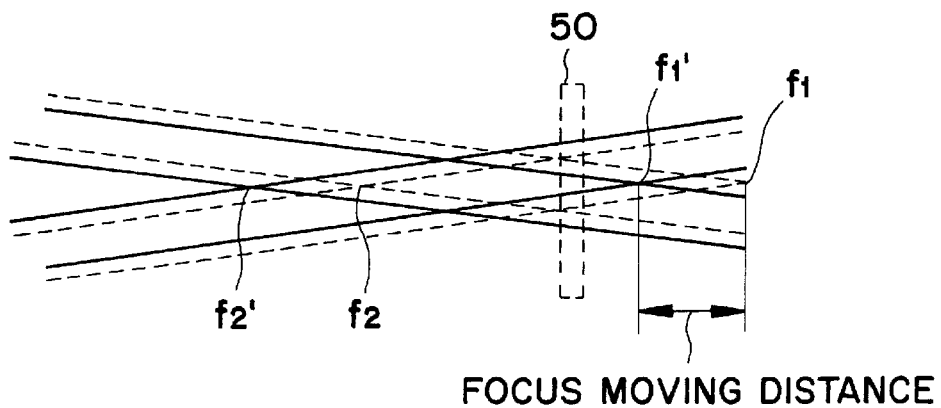
FIG. 10 shows the change in the focus of diffracted light, according to a change in the wavelength of the light emitted from a light source, due to a recording operation or a change in the temperature.

FIG. 10 is a diagram for explaining the principle of the error signal detecting apparatus according to the present invention suppressing generation of an offset of a focus error signal due to a change in the wavelength of the light emitted from a light source, according to a recording operation and a change in the temperature.

If the wavelength increases compared to that during the adjustment for the assembly of an optical element, the refractive index of the optical element changes. In view of the overall optical system ranging from the light source and the photodetector 50, the first and second focuses $f_1$ and $f_2$ of the beam diffracted by the hologram grating 30 moves toward to the sensing lens 20 in an on-focus state to then be focuses $f_1'$ and $f_2'$, which is caused by the effect of an objective lens.

Figure 11:
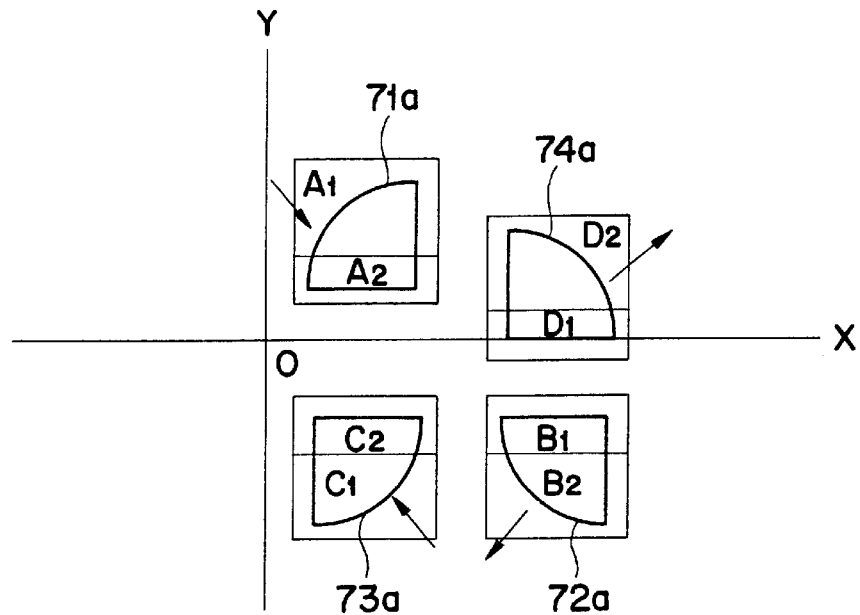
FIGS. 11 and 12 are diagram for explaining the principle of the error signal detecting apparatus according to the present invention suppressing generation of an offset of a focus error signal according to the change in wavelengths.

When a change in the diffraction angle of the ±1st-order diffracted beams received in the photodetector 50 is not considered, the focuses are moved toward the sensing lens 20 in an on-focus state, as shown in FIG. 11, so that the sizes of the light spots formed on the bisectional light receiving parts A1/A2 and C1/C2 become smaller in the arrow directions. Thus, the detection signals are such that A1<A2 and C1<C2. The sizes of the light spots formed on the bisectional light receiving parts B1/B2 and D1/D2 become larger in the arrow directions. Thus, the detection signals are such that B1<B2 and D1<D2. Therefore, the focus error signal becomes smaller than zero, that is, (A1+B1+C1+D1)−(A2+B2+C2+D2)<0.

Figure 12:
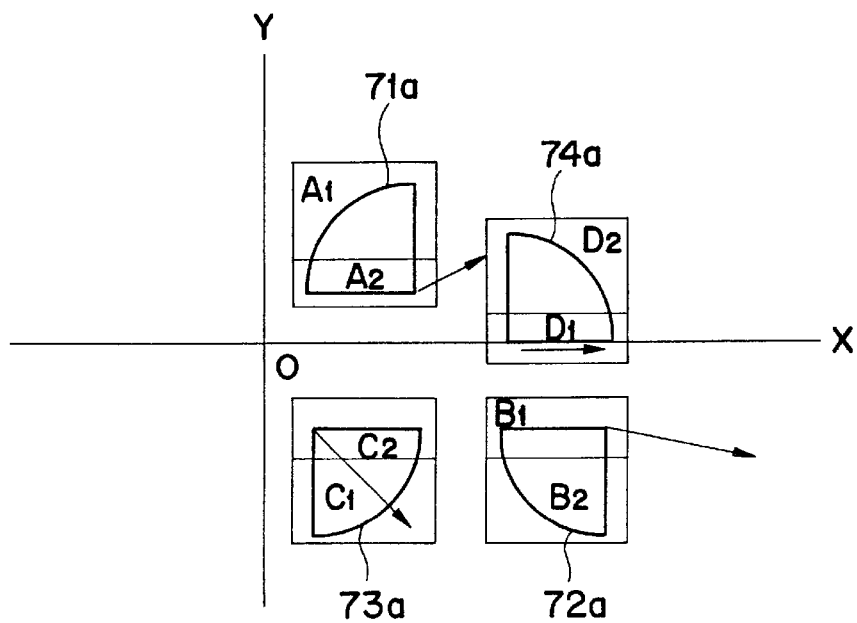

However, the light received in the photodetector 50 is the ±1st-order diffracted beams diffracted by the hologram grating 30 and the diffraction angle θ of the diffracted beams is related to the wavelength λ such that sin θ=λ/p (Here, p is the pitch of the hologram grating 30.). Thus, if the wavelength λ becomes longer, then the diffraction angle θ increases. In other words, as shown in FIG. 12, the +1st-order diffracted beams 71a, 72a, 73a and 74a received in the bisectional light receiving parts A1/A2, B1/B2, C1/C2 and D1/D2 are shifted to be distant from the origin. Here, although not shown, the −1st-order diffracted beams are also shifted to be distant from the origin.

Accordingly, as indicated by arrows shown in FIG. 12, the +1st-order diffracted beams 71a and 73a received in the bisectional light receiving parts A1/A2 and C1/C2 are shifted from the sectional light receiving parts A2 and C2 toward the sectional light receiving parts A1 and C1, that is, in the direction in which an offset generated due to the focus shift toward the sensing lens 20 is decreased.

Also, the +1st diffracted beam 72a received in the bisectional light receiving part B1/B2 is shifted from the sectional light receiving part B1 toward the sectional light receiving part B2, that is, in the direction in which an offset generated due to the focus shift is increased. The +1st diffracted beam 74a received in the bisectional light receiving part D1/D2 is shifted in parallel with the division boundary line of the bisectional light receiving part D1/D2. In this case, an offset generated due to the focus shift is not changed. Thus, the overall offset of the focus error signal is reduced.

As a result, an offset of the focus error signal generated according to a change in the wavelength of the light emitted from the light source can be almost removed by employing the hologram grating 30 and the photodetector 50 according to the present invention.

As described above, in the error signal detecting apparatus according to the present invention, a focus error signal and/or a track error signal are detected by using a hologram grating having first through fourth pattern regions for diffracting incident light in different directions and a photodetector having single and bisectional light receiving parts for receiving the ±1st-order diffracted beams diffracted by the hologram grating. Therefore, generation of an offset of a focus error signal due to a change in the wavelength of a light source and an offsets of the focus error signal and track offset signal due to deviations of the photodetector can be suppressed.

What is claimed is:

1. An error signal detecting apparatus for an optical pickup employing a hologram grating, comprising:

a sensing lens for focusing light reflected from a recording medium;

a hologram grating having first through fourth pattern regions arranged clockwise in a 2×2 matrix arrangement, for diffracting light incident from the sensing lens in different directions, wherein the first through fourth pattern regions a, b, c and d are formed such that a first focus of the +1 st-order diffracted beams diffracted by the first and third pattern regions is relatively farther from the sensing lens than a second focus of the +1 st-order diffracted beams diffracted by the second and fourth pattern regions;

a photodetector disposed between the first and second focuses and having first through fourth light receiving units, for receiving the beams diffracted by the first through fourth pattern regions and independently photoelectrically converting the same; and a signal operation unit for detecting a focus error signal and/or a track error signal from detection signals of the light receiving parts.

2. The error signal detecting apparatus according to claim 1, wherein the first through fourth light receiving units include first through fourth bisectional light receiving parts each for receiving a diffracted beam among ±1 st-order diffracted beams diffracted by the first and fourth pattern regions.

3. The error signal detecting apparatus according to claim 2, wherein the signal operation unit obtains differences between the detection signals of the respective bisectional light receiving parts and sums the differences between the detection signals to detect a focus error signal.

4. The error signal detecting apparatus according to claim 2, wherein the first through fourth light receiving parts further comprise first through fourth single light receiving parts for receiving another diffracted beams diffracted by the first through fourth pattern region.

5. The error signal detecting apparatus according to claim 4, wherein the signal operation unit obtains a difference between the sum signal of the first and fourth single light receiving parts and the sum signal of the second and third single light receiving parts to detect the track error signal.

6. The error signal detecting apparatus according to claim 2, wherein the first through fourth bisectional light receiving parts are positioned substantially on the first and fourth quadrants of a x-y coordinate system, respectively, are bisected parallel to the x-axis, one-side sectional light receiving parts of the first and third bisectional light receiving parts are disposed inward with respect to the other-side sectional light receiving parts thereof, and one-side sectional light receiving parts of the second and fourth bisectional light receiving parts are disposed inward with respect to the other-side sectional light receiving parts thereof.

7. The error signal detecting apparatus according to claim 6, wherein the signal operation unit obtains differences between the detection signals of the respective bisectional light receiving parts and sums the differences to detect a focus error signal.

8. The error signal detecting apparatus according to claim 6, wherein the first through fourth light receiving parts further comprises first through fourth single light receiving parts for receiving another diffracted beams diffracted by the first through fourth pattern regions.

9. The error signal detecting apparatus according to claim 8, wherein the signal operation unit obtains a difference between the sum of the detection signals of the first and fourth single light receiving parts and the sum of the detection signal of the second and third single light receiving parts to then detect a track error signal.

* * * * *